(12) United States Patent
Choudhary

(10) Patent No.: US 8,606,315 B2
(45) Date of Patent: Dec. 10, 2013

(54) MULTI-DIMENSIONAL ACCESS FOR MOBILE USER EQUIPMENT

(75) Inventor: Amit Choudhary, Munich (DE)

(73) Assignee: LSI Corporation, Milpitas, CA (US)

( * ) Notice: Subject to any disclaimer, the term of this patent is extended or adjusted under 35 U.S.C. 154(b) by 5 days.

(21) Appl. No.: 12/515,446

(22) PCT Filed: Jul. 13, 2007

(86) PCT No.: PCT/US2007/073438
§ 371 (c)(1),
(2), (4) Date: May 19, 2009

(87) PCT Pub. No.: WO2009/011691
PCT Pub. Date: Jan. 22, 2009

(65) Prior Publication Data
US 2010/0105376 A1    Apr. 29, 2010

(51) Int. Cl.
*H04M 1/00*      (2006.01)
*H04M 1/66*      (2006.01)

(52) U.S. Cl.
USPC ............. 455/553.1; 455/552.1; 455/411

(58) Field of Classification Search
USPC .................. 455/552.1–553.1, 410–411
See application file for complete search history.

(56) References Cited

U.S. PATENT DOCUMENTS 6,141,564 A * 10/2000 Bruner et al. ............. 455/558
6,223,053 B1 * 4/2001 Friedmann et al. ....... 455/552.1
7,929,435 B2   4/2011 Ono et al.
2003/0119547 A1 * 6/2003 Leyh et al. ............... 455/552
2007/0021066 A1 * 1/2007 Dravida et al. ........... 455/41.2
2007/0038764 A1   2/2007 Maillard
2007/0211675 A1 * 9/2007 Jain et al. ................. 370/338
2008/0176595 A1 * 7/2008 Karaoguz ................. 455/552.1
2008/0279128 A1 * 11/2008 Hassan et al. ............ 370/310

FOREIGN PATENT DOCUMENTS

| CN | 200510061508 | 3/2006 |
| JP | 2005295087 | 10/2005 |
| JP | 2007088857 | 4/2007 |
| JP | 2007110607 | 4/2007 |
| WO | WO/2004/105272 | 12/2004 |
| WO | WO/2005/055524 | 6/2005 |

OTHER PUBLICATIONS

SIPO via Shanghai Patent & Trademark Law Office LLC, Text of the First Office Action; Jul. 2012; People's Republic of China.

* cited by examiner

*Primary Examiner* — Steven Lim

(57) ABSTRACT

A mobile communications device Includes at least two long-range wireless Communications engines. Each long-range wireless communications engines includes a respectively different communications protocol stack, for receiving or transmitting first long-range wireless communications signals using a first long-range communications protocol simultaneously while receiving or transmitting second long-range wireless communications signals using a second long-range communications protocol At least two radio frequency blocks are provided, for receiving or transmitting the first long-range wireless signals simultaneously while receiving or transmitting the second long-range wireless signals. A user interface is provided for inputting and outputting user data Io and from the at least two long-range wireless communications engines, respectively.

16 Claims, 2 Drawing Sheets

MULTI-DIMENSIONAL ACCESS FOR MOBILE USER EQUIPMENT

FIELD OF THE INVENTION

The present invention relates to mobile user equipment, such as wireless phones and wireless devices having telephone capabilities.

BACKGROUND

A variety of mobile telephone standards have emerged. Many wireless telephones are only capable of communicating using a single technology, such as Global System for Mobile Communications (GSM)/General Packet Radio Service (GPRS), Wideband Code Division Multiple Access (WCDMA), Wireless Local Area Network (WLAN), or the like. Some newer multi-mode mobile phones have emerged, which provide access to the network via one of two or more of the above-listed technologies, and allows switching from one technology to another.

For example, consider a "dual-mode user equipment (UE)". This kind of mobile telephone can operate in either a third generation (3G) or a second generation (2G) cell, but only one at a given time. For example, consider a scenario in which the mobile phone is initially operating in a 3G cell. The user starts a file download. After some time, the network orders the mobile phone to switch to a 2G cell—this could be due to various reasons such as had 3G coverage at a given location, or cell overloading in the 3G cell, or the like. Then the mobile switches to a 2G (GPRS) cell and continues the file download.

Improved methods of servicing wireless telephones are desired.

SUMMARY OF THE INVENTION

In some embodiments, apparatus for wireless communication comprise a first means for receiving or transmitting first long-range wireless communications signals, a second means for receiving or transmitting second long-range wireless communications signals simultaneously while receiving or transmitting said first long-range wireless communications signals and a means for inputting user data to the first and second long-range wireless communications engines, respectively.

In some embodiments, a mobile communications device comprises at least two long-range wireless communications engines. Each long-range wireless communications engine includes a respectively different communications protocol stack, for receiving or transmitting first long-range wireless communications signals using a first long-range communications protocol simultaneously while receiving or transmitting second long-range wireless communications signals using a second long-range communications protocol. At least two radio frequency blocks are provided, for receiving or transmitting the first long-range wireless signals simultaneously while receiving or transmitting the second long-range wireless signals. A user interface is provided for inputting and outputting user data to and from the at least two long-range wireless communications engines, respectively.

In other embodiments, a communications method comprises receiving or transmitting first long-range wireless communications signals using a first long-range wireless communications engine and a first communications protocol simultaneously while receiving or transmitting second long-range wireless communications signals using a second long-range wireless communications engine and a second communications protocol. The first and second long-range wireless communications engines are contained within a single mobile communications device. A step of receiving or transmitting the first long-range wireless signals via a first radio frequency (RF) block is performed simultaneously while receiving or transmitting the second long-range wireless signals via a second RF block, where the first and second RF blocks are contained within the single mobile communications device. The user data are input and output to and from the at least two long-range wireless communications engines, respectively.

DETAILED DESCRIPTION

This description of the exemplary embodiments is intended to be read in connection with the accompanying drawings; which are to be considered part of the entire written description. Terms concerning coupling and the like, such as "connected" refer to a relationship wherein devices are electrically connected to one another either directly or indirectly through intervening wired or wireless interfaces, unless expressly described otherwise.

Figure 1:
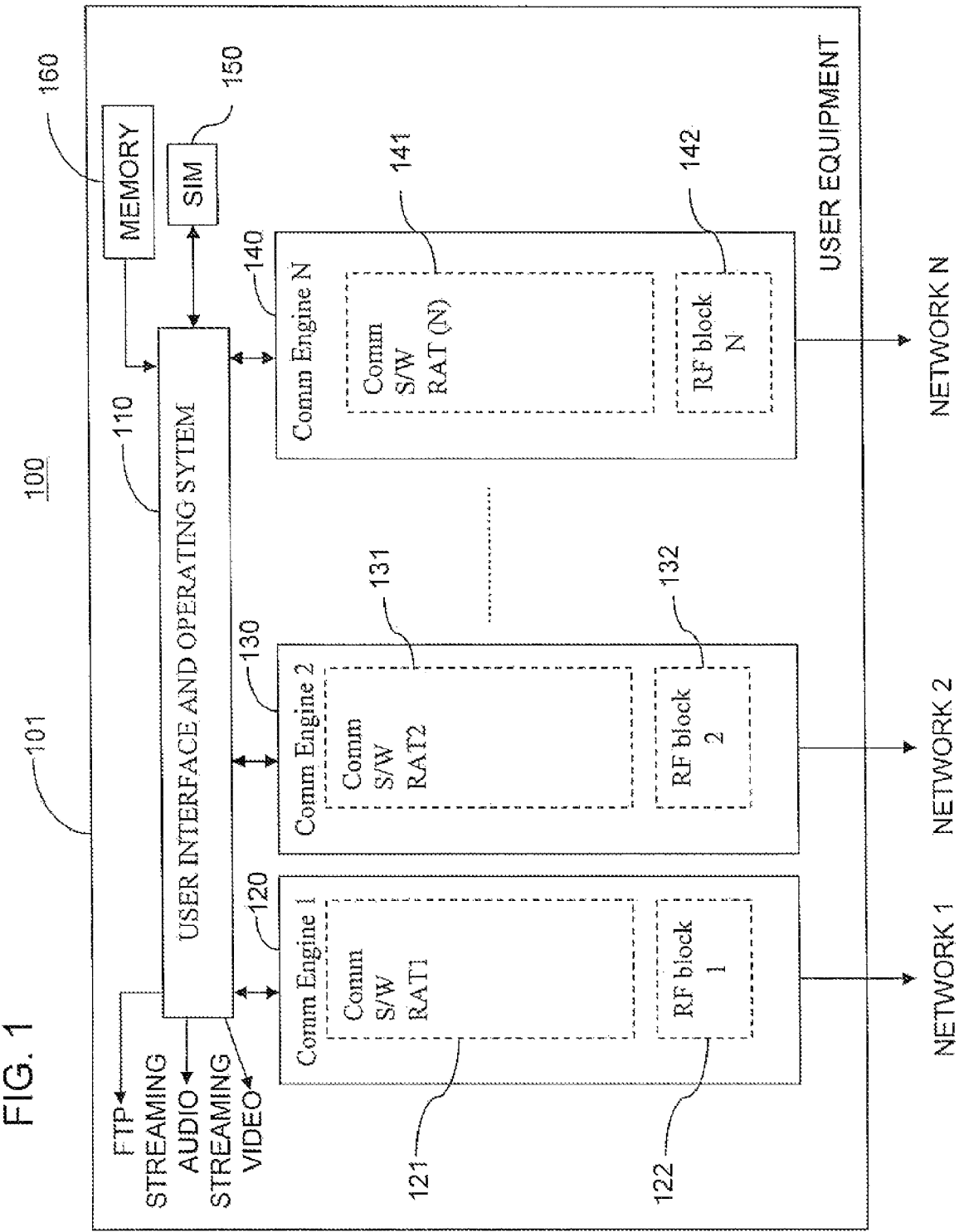
FIG. 1 is a block diagram of an exemplary mobile device according to one embodiment of the invention.

FIG. 1 is a block diagram of an exemplary mobile communications device 100, also referred to as user equipment (UE). The device 100 includes at least first and second means for receiving or transmitting first long-range wireless communications signals. For example, the first and second means for receiving or transmitting long-range wireless communications signals may include a plurality of long-range wireless communications engines 120, 130, 140 within a single housing 101. The device 100 may be a mobile telephone, or any of a class of mobile handheld communications devices combining cellular telephone service with one or more computing or communications functions, such as facsimile, email, short message service (SMS), Internet web browsing, or the like.

As used herein, the term "long-range wireless communications" encompasses bun-range wireless interfaces such as cellular radio interfaces (GSM/GPRS, WCDMA, SCDMA, etc.), wireless broadband, and some versions of WLAN (802.11), typically having a signal range of 100 meters or more, as distinguished from short range wireless interfaces and personal area networks such as Bluetooth (with a typical signal range on the order of 1 meter to 10 meters), and as distinguished from short range infrared interfaces.

Each long range wireless communications engine 120, 130, 140 within the single housing 101 includes a respectively different communications protocol stack. Communications engine 120 has a communications software protocol stack 121, designated radio access technology 1 (RAT1), and an RF block 122, for receiving or transmitting first long-range wireless communications signals using a first long-range communications protocol (e.g., (ISM/GPRS). Communications engine 130 has a communications software protocol stack 131, designated radio access technology 2 (RAT2), and an RF block 132, for receiving or transmitting first long-range wireless communications signals using a second long-range communications protocol (e.g., WCDMA). Communications engine 140 has a communications software protocol stack 141, designated radio access technology N (RATN), and an RF block 142, for receiving or transmitting the Nth long-range wireless communications signals using an Nth long-range communications protocol (e.g., SCDMA or WLAN). The device 100 can transmit or receive long-range wireless communications signals using first communications engine 120 simultaneously while receiving or transmitting second long-range wireless communications signals using a second long-range communications protocol. Although a few exemplary protocols are identified above, other long-range communications protocols may be used.

Device 100 has a means for inputting user data to the first and second long-range wireless communications engines. For example, the inputting means may comprise a user interface 110 for inputting and outputting user data to and from the at least two long-range wireless communications engines, respectively. The user interface may be provided by the operating system of the device 100. In some embodiments, a suitable operating system platform for device 100 may include, but is not limited to multi-tasking operating systems, such as for example, Nucleus OS, Embedded Linux. Windows CE or the like). Implementation of protocol software uses the mull-tasking capability for 3G, 2G, and the like.

The mobile communications device 100 further includes a subscriber identity module (SIM) block 150 accessible by each of the long-range wireless communications engines. In some embodiments, data transfers between the SIM block 150 and the communications engines 120, 130 and 140 are controlled by the user interface and operating system 110, SIM block 150 accesses a portable SIM card (not shown) that a user can transfer between telephones. A single SIM (Subscriber Identity Module) block 150 may be shared by all the communications engines 120, 130, 140. In mobile computing, "context" is the circumstances under which a device is being used, e.g. the current occupation of the user. Also, a single registration context may be shared by all the communications engines 120, 130 and 140, and setup for the device 100 by any of the communications engines may be shared.

The mobile communications device 100 further includes a memory 160 that stores at least two application programs that the mobile communications device is capable of executing. The at least two application programs include two or more applications, such as but not limited to, an file transfer protocol (FTP) interface, a streaming video interface and a streaming audio interface.

Because the device 100 includes two or more sets of communications engine hardware and software 120, 130, 140, the communications engines are capable of operating independently of each other. Two of the communications engines (e.g., 120 and 130) may both receive data simultaneously from the same source or different sources, or may both transmit data simultaneously to the same destination or different destinations, or one engine 120 may receive data from a first node while another engine 130 simultaneously transmits data to the same node Or to a different second node.

The model presented above is of a generic user equipment (device 100) providing multiple communication paths over different Radio Access Technologies (RATs) simultaneously within a single housing 101. Each communication path is supported by its own Communication Engine 120, 130, 140 which includes its protocol software 121, 131, 141, respectively, and a dedicated RF block 122, 132, 142, respectively. At a geographical location where different RATs are available for the UE 100 to connect to, these multiple communication paths 120, 130, 140 allow the user to avail different services on different RATs simultaneously, or to obtain better quality of service.

For example, assume a mobile device 100 is operating in a 3G cell. Then the user starts a "file download" using file transfer protocol (FTP), and the connection is setup on the 3G communications engine (e.g., first communications engine 120). FTP runs on top of TCP/IP protocol using packet switching. TCP/IP permits different packets to take different routes from the source to the destination. After some time the mobile device 100 detects a 2G cell with a strong signal as well, and starts a connection on the 2G cell (using the second communications engine 1301 to complement this ongoing file download. TCP/IP in the mobile node detects that the two communications engines 120 and 130 are both delivering packets of the file. At this point, the mobile device 100 has two parallel connections in 2 different cells (supporting 3G and 2G respectively) for the same user application. TCP in the mobile device 100 attends to reassembling and sequencing the packets received from the two communications engines 120, 130 into a single ordered packet stream. TCP also manages scenarios related to dynamic routing or packets (e.g., out-of-sequence packet delivery, retransmissions, throughput adjustments, etc).

So, in the example in which two different RATs, (e.g., 2G and 3G) are both available, and the mobile device 100 is executing an application capable of communicating via either RAT, the exemplary device 100 may be used to provide an effectively higher bandwidth to a single user application while both interfaces provide a strong signal, and/or switching over completely from the first RAT (cell) to the second RAT (cell), when the signal strength from the first RAT is no longer acceptable.

In other examples, the exemplary device may be used to provide, two or more services to two or more different applications simultaneously. For example, the user may be downloading a file using, the WLAN communications engine (e.g., 120), when a telephone call is received or made via the GSM communications engine (e.g., 130). Instead of stopping the download for the duration of the telephone call, or canceling the download, the exemplary device 100 is able to continue the download during the telephone call without a break in the download communications.

Although an example is provided in which TCP is used to provide transport level services, any other connection oriented application that provides services similar to the level 4 services of the transport layer (according to the Open System Interconnect reference model, ISO 7498) may be used. Although an example of FTP is described above for the application, a variety of applications can make use of the multiple communications engine capabilities, including, but not limited to, FTP, streaming video and streaming audio.

Figure 2:
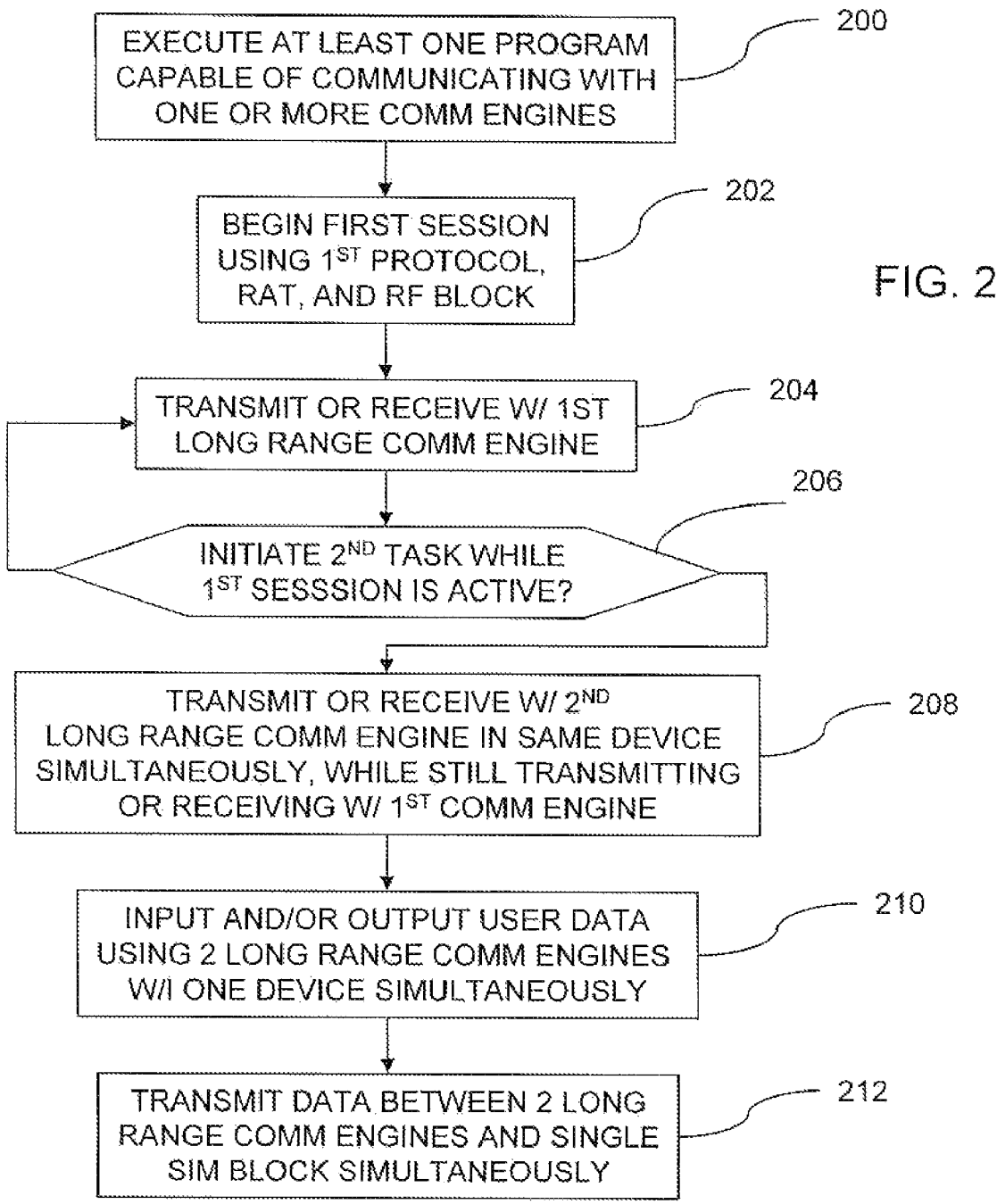
FIG. 2 is a flow diagram of an exemplary method of operating the device of FIG. 1.

FIG. 2 is a flow chart of an exemplary communications method.

At step 200, the mobile device 100 executes at least one program capable of communicating with more than one communication engine.

At step 202, the mobile device 100 begins a first session or task, using a first communications protocol, a first RAT, and a first RF block.

At step 204, the mobile device transmits or receives data using the first communications engine 120.

At step 206, if a second communications task is initiated while the first communications task is active, and the second communications task uses a different communications engine than the first communications engine 120, then step 208 is executed. Otherwise, execution of step 204 continues alone.

At step 208, the mobile device 100 transmits or receives data with the second long range communications engine 130 via a second radio frequency (RF) block 132 simultaneously, while stilt transmitting or receiving data with the first long range communications engine 120 via a first radio frequency (RF) block 122 in the same device 100.

At step 210, the mobile device 100 inputs and/or outputs user data to and from the at least two long-range wireless communications engines 120 and 130, respectively.

At step 212, the mobile device 100 transmits data between a single subscriber identity module (SIM) block 150 and each of the long-range wireless communications engines 120, 130, 150.

To demonstrate a specific example of this method, consider a user equipment UE 100 equipped as described below including:
- communications engine 1 for WCDMA
- communications engine 2 for GSM GPRS
- Single user SIM block
- Single UI (User interface) interfacing with both the communications engine(s)

Below is a possible sequence of events:

1. UE 100 is switched ON, and depending on the "Preferred RAT" defined in the SIM, it activates the respective communications engine, in this specific case, assume it is 1 (i.e WCDMA).

2. The UE 100 scans the radio frequencies and camps on a WCDMA cell (Cell1)

3. The UE 100 invokes the Registration Procedure (Location Update/Attach procedure and creates a Registration Context (X)

4. An FTP service is invoked by the user.

5. The UI 110 invokes communications engine 1 120 and sets up a packet switched (PS) connection to the Network 1 over WCDMA.

6. The FTP service is setup over RAT WCDMA, and the file transfer is ongoing

7. After some time, the user invokes a voice call, and the user interface 110 invokes communications engine 2 130 to setup a circuit switched (CS) connection for this service.

8. Communications engine 2 130 (for (GSM/GPRS) is activated, scans the GSM/GPRS radio frequencies according to the information provided by the SIM 150, and camps on a GSM/GPRS cell (Cell2).

9. Communications engine 2 130 now sets up a connection to the Network 2 and uses the same registration context (X) (previously setup on WCDMA Cell1) to identify itself and request the service, in this case, resources for a Voice call. The network operator in turn verifies the UE 100 using the registration information it maintains, and grants network resources on the second RAT, i.e. GSM/GPRS 130. At this point, UE has 2 parallel connections CS and PS to the Network via two different radio access technologies GSM/GPRS and WCDMA respectively.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A mobile communications device, comprising:
   at least two long-range wireless communications engines, each including a respectively different communications protocol stack, for transmitting first long-range wireless communications signals using a first long-range communications protocol simultaneously while transmitting second long-range wireless communications signals using a second long-range communications protocol;
   at least two radio frequency blocks, each dedicated to one of the at least two long-range wireless communication engines, for transmitting the first long-range wireless signals simultaneously while transmitting the second long-range wireless signals;
   a user interface for inputting and outputting user data to and from the at least two long-range wireless communications engines, respectively; and
   a single subscriber identity module (SIM) block simultaneously accessible by each of the long-range wireless communications engines.

2. The mobile communications device of claim 1, wherein the first and second communications protocols include at least two of the group consisting of GSM/GPRS, WCDMA, SCDMA and WLAN.

3. The mobile communications, device of claim 1, wherein the first and second communications protocols are GSM/GPRS and WCDMA, respectively.

4. The mobile communications device of claim 1, wherein the mobile communications device is a mobile telephone.

5. The mobile communications device of claim 1, further comprising a memory that stores at least two application programs that the mobile communications device is capable of executing.

6. The mobile communications device of claim 5, wherein the at least two application programs include two of the group consisting of a file transfer protocol (FTP) interface, a streaming video interface and a streaming audio interface.

7. The mobile communications device of claim 1, wherein the at least two long-range wireless communications engines are contained within a single housing.

8. The mobile communications device of claim 1, user interface inputs and outputs the same user data to and from the at least two long-range wireless communications engines.

9. A communications method, comprising the steps of:
   (a) transmitting, first long-range wireless communications signals using a first long-range wireless communications engine and a first communications protocol simultaneously while transmitting second long-range wireless communications signals using a second long-range wireless communications engine and a second communications protocol, said first and second long-range wireless communications engines contained within a single mobile communications device;
   (b) transmitting the first long-range wireless signals via a first radio frequency (RF) block dedicated to the first communications engine simultaneously while transmitting the second long-range wireless signals via a second RF block dedicated to the second communications engine, the first and second RF blocks contained within the single mobile communications device;
   (c) inputting and outputting user data to and from the at least two long-range wireless communications engines, respectively; and
   (d) simultaneously transmitting data between a single subscriber identity module (SIM) block and each of the long-range wireless communications engines.

10. The method of claim 9, wherein the first and second communications protocols include at least two of the group consisting of GSM/GPRS, WCDMA, SCDMA and WLAN.

11. The method of claim 9, wherein the first and second communications protocols are GSM/GPRS and WCDMA.

12. The method of claim 9, wherein the single mobile communications device is a mobile telephone.

13. The method of claim 9, further comprising executing at least one application program that communicates with the first and second long-range wireless communications engines.

14. The method of claim 13, wherein the at least one application program includes two of the group consisting of a file transfer protocol (FTP) interface, a streaming video interface and a streaming audio interface.

15. The method of claim 9, wherein step (a) includes receiving packets corresponding to a single download operation via the first and second long-range wireless communications engines simultaneously.

16. The method of claim 9, wherein step (e) comprises inputting and outputting the same user data to and from the at least two long-range wireless communications engines.

* * * * *